Feb. 22, 1944. C. F. HOTCHKISS, JR 2,342,343
APPARATUS FOR MAKING FLEXIBLE SHAFTING
Filed Aug. 30, 1943 6 Sheets-Sheet 1
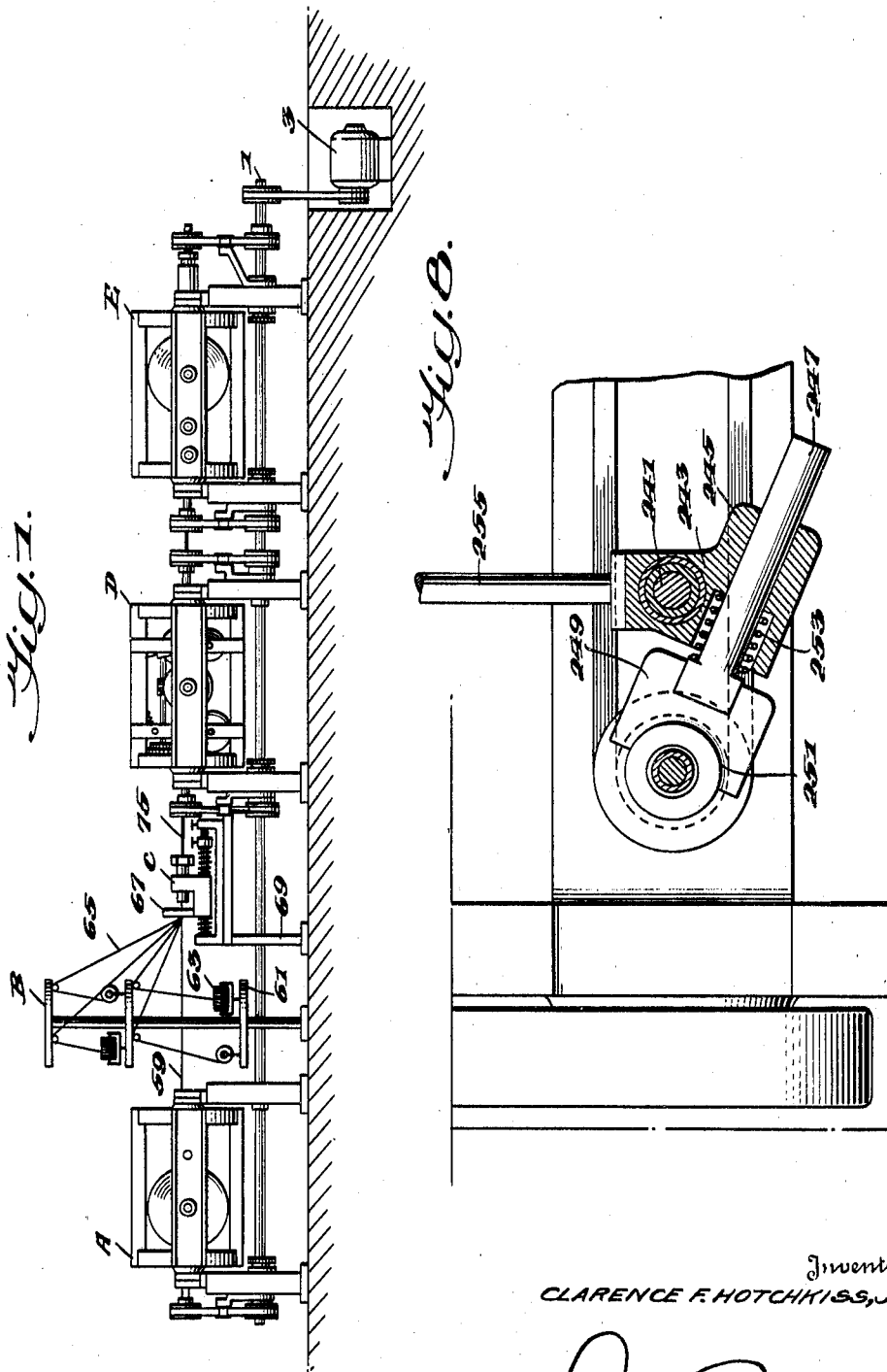
Inventor
CLARENCE F. HOTCHKISS, JR.
By Leech & Radue
Attorneys

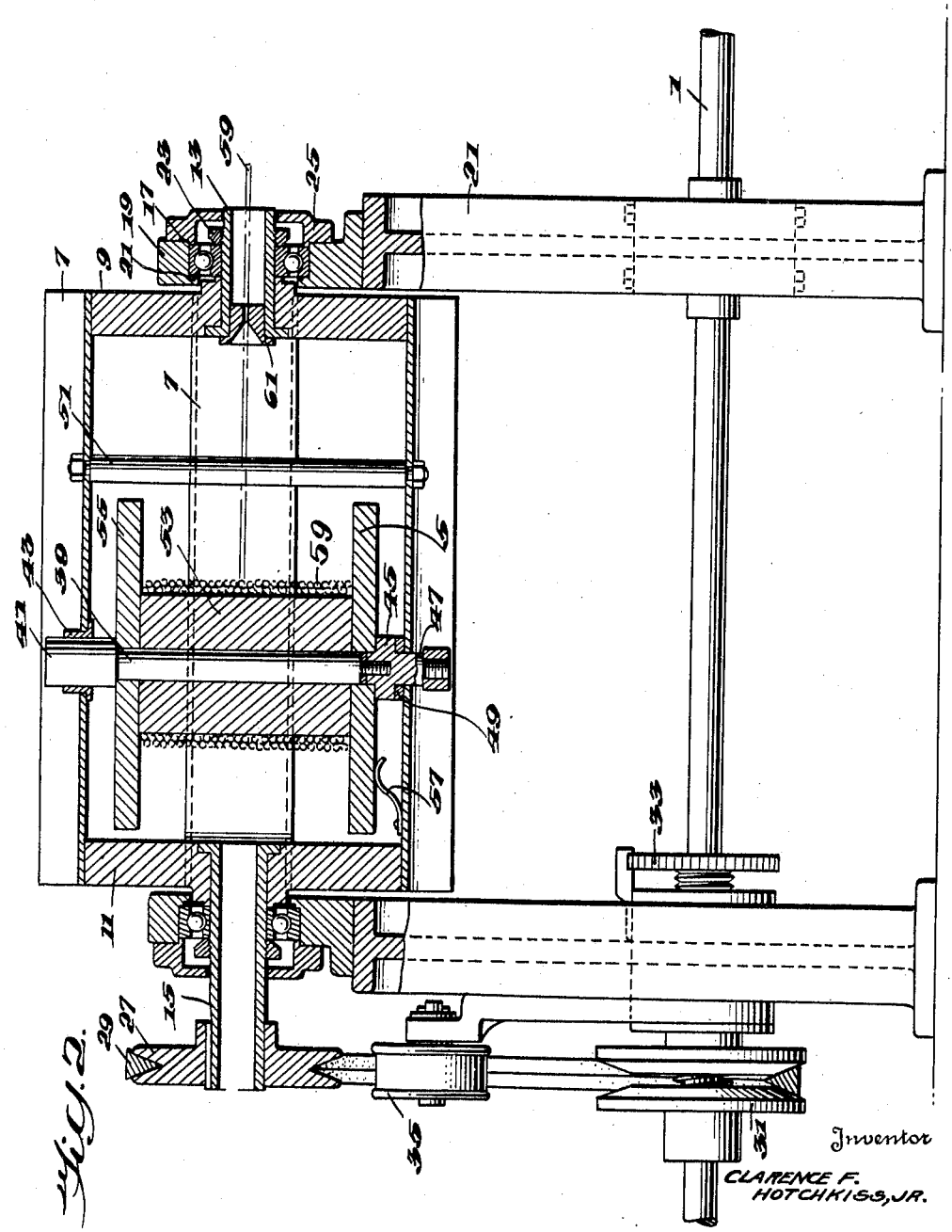

Feb. 22, 1944. C. F. HOTCHKISS, JR 2,342,343
APPARATUS FOR MAKING FLEXIBLE SHAFTING
Filed Aug. 30, 1943 6 Sheets-Sheet 3
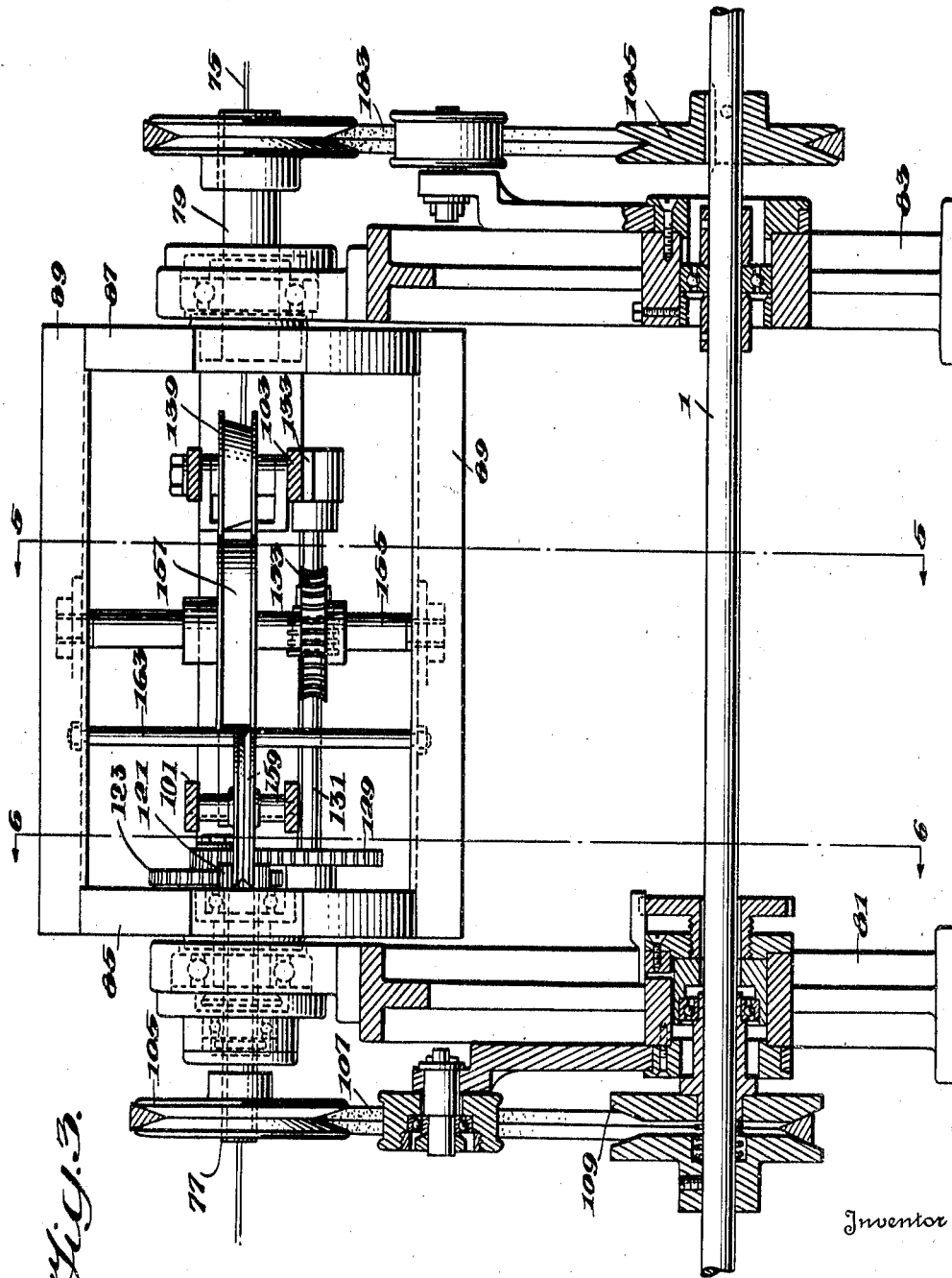
Inventor
CLARENCE F. HOTCHKISS, JR.
By Leech & Raelue
Attorneys

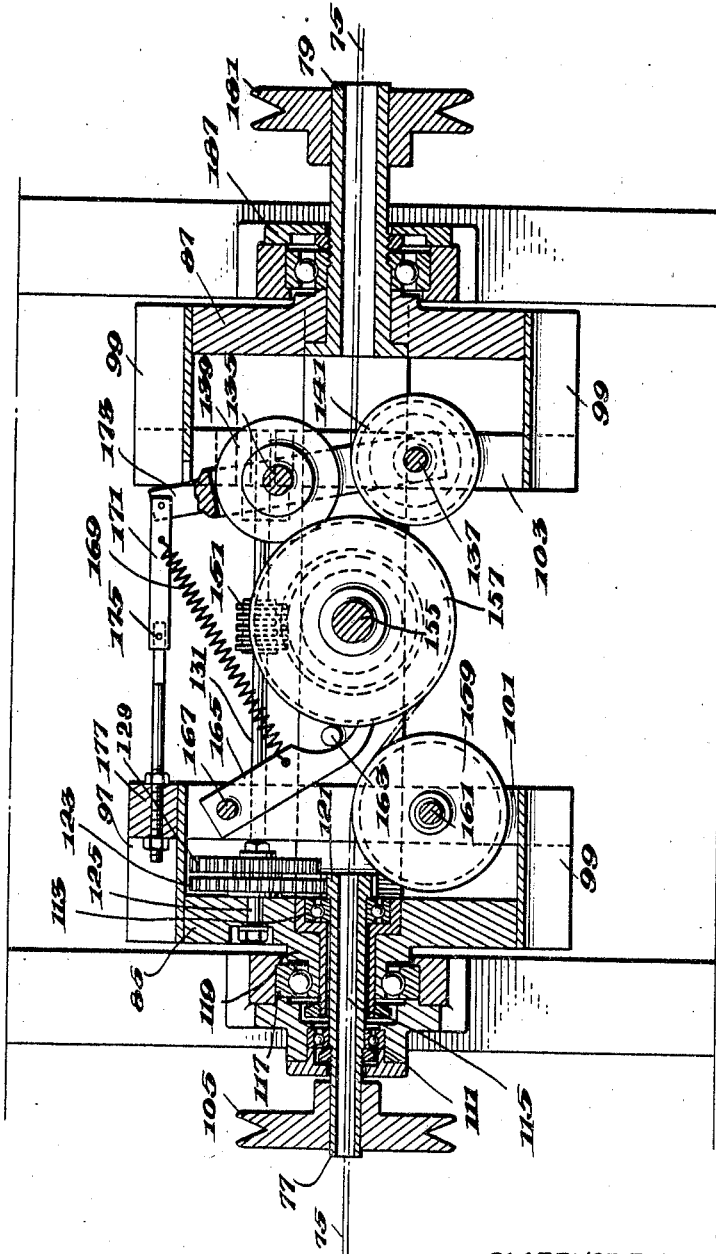

Feb. 22, 1944.   C. F. HOTCHKISS, JR   2,342,343
APPARATUS FOR MAKING FLEXIBLE SHAFTING
Filed Aug. 30, 1943    6 Sheets-Sheet 5
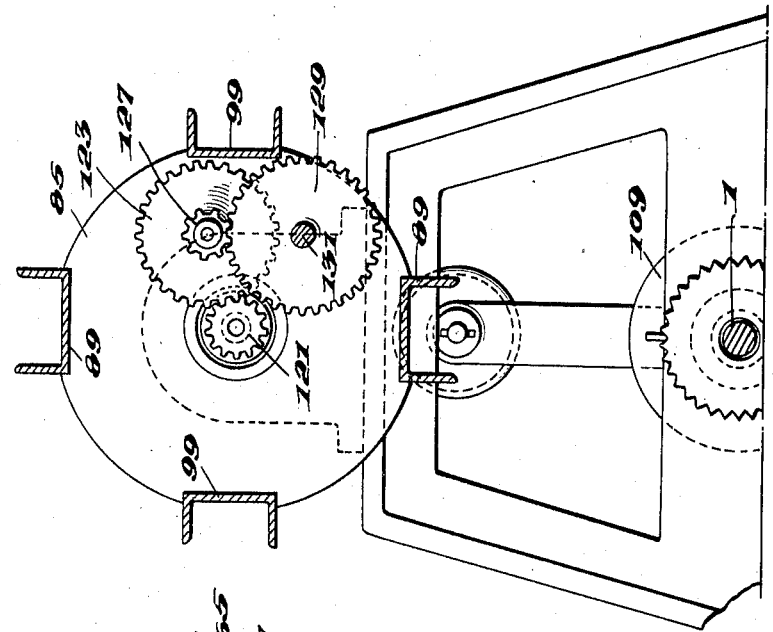
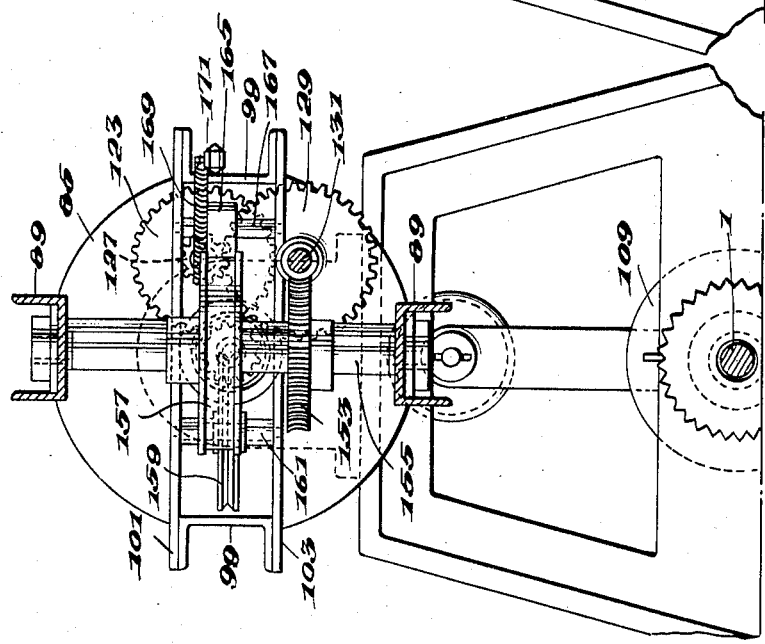
Inventor
CLARENCE F. HOTCHKISS, JR.
By
Attorney

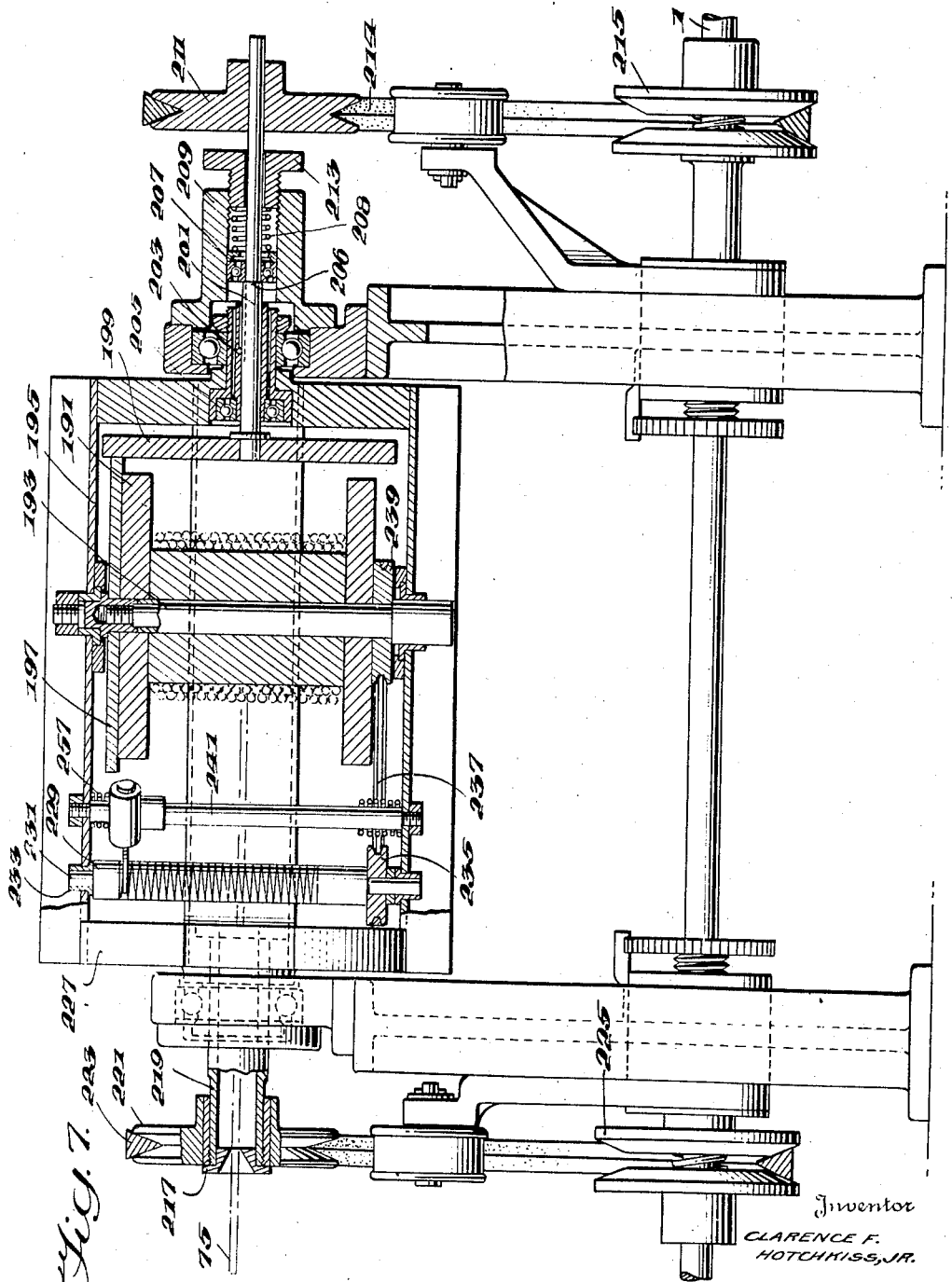

Patented Feb. 22, 1944

2,342,343

UNITED STATES PATENT OFFICE 2,342,343

APPARATUS FOR MAKING FLEXIBLE SHAFTING

Clarence F. Hotchkiss, Jr., Binghamton, N. Y., assignor to Stow Manufacturing Company, Inc., Binghamton, N. Y., a corporation of New York Application August 30, 1943, Serial No. 500,585

2 Claims. (Cl. 57—1)

This invention relates to an apparatus for producing long lengths of flexible shafting, and more particularly to a semi-automatic machine wherein a supply of core or initially wound flexible shaft is fed from a supply reel and passed through a winding station where a plurality of wires are layered in spirally wound relation on to the core or initially wound shaft after which the flexible shafting is collected on a take-off reel.

One object of the invention is the construction of a comparatively simple apparatus which will insure the even winding on a core or initially wound shaft of a surface coat of spirally wrapped wires with means for alternately winding the successive layers in opposite directions.

A further object of the invention is to construct a machine of this character wherein substantially long cables may be wound with little attention on the part of the operator except to replenish the supply reel and remove the take-up reel.

A still further object of the invention is to provide a compact flexible shaft winding machine which is driven from a single motor driven shaft with take-off pulleys for rotating the several adjacent longitudinally arranged stations or integrated units of the machine.

In the drawings:

Fig. 1 is a side elevation of a complete flexible shaft winding machine showing the various combinations thereof and the driving mechanism:

Fig. 2 is a side elevation partly in cross-section of the core or initially wound shafting supply reel showing the manner of rotating the cage carrying the supply reel and the manner in which the core or shafting is drawn therefrom;

Fig. 3 is a side elevation partly in cross-section of the central station wherein the core or initially wound cable is rotated and drawn through the machine while the individual wires forming the layer are placed thereon;

Fig. 4 is an enlarged view partly in cross-section of the winding head or mechanism per se;

Fig. 5 is a vertical section taken on line 5—5 of Fig. 3 looking in the direction of the arrows;

Fig. 6 is a similar view to Fig. 5 taken on line 6—6 of Fig. 3;

Fig. 7 is a side elevation partly in cross-section of the take-up reel and traverse mechanism whereby the initially wound or finished flexible shafting is placed on a spool or reel;

Fig. 8 is an enlarged fragmental view partly in section, of the traverse mechanism associated with the flexible shafting pickup unit.

Referring to Fig. 1, the apparatus may be conveniently broken down into cooperating units or stations A, B, C, D and E. A denotes the core or initially wound shafting supply reel and mechanism for rotating and unwinding the material carried on the reel. B represents a wire supply station or stand for holding a plurality of spools of wire which are drawn off and wound on to the core or initially wound shafting as the core or initially wound shafting passes through the draw or winding tool C. D is the mechanism for positively drawing the core or initially wound shafting through the winding tool C whereby the several wires of the layer being wound are spirally laid thereon. At station D the shafting is pulled through the unit and simultaneously rotated to insure that the wires of the layer will be laid up thereon at the proper degree of spiral pitch and compactness, while unit E is the takeup unit wherein the initially wound or finished shafting is collected on a driven takeup spool and uniformly built up thereon in smooth superimposed layers by means of a driven traverse mechanism or guide.

For ease of understanding, these several units or stations will be described in detail whereupon their cooperation and interdependence will be readily understood by those skilled in the art.

The three power driven units A, D and E are preferably individually mounted on suitable standards in longitudinally spaced relation with each unit driven from a common power shaft 1, mounted in suitable bearings and running throughout the length of the composite machine. The power shaft 1 is driven by a motor 3, and while belts have been shown as the power transmitting mechanism to each driven unit throughout the apparatus, it will be understood that any other power transmitting medium may be employed.

In Fig. 2 the core or initially wound shafting supply spool or reel 5 is shown mounted in a rotatable cage made up of horizontal bars 7 equally spaced around the peripheries of end plates 9 and 11. These end plates 9 and 11 in turn are mounted for rotation on axles 13 and 15 respectively. The hollow tubular axle 13 may be press fitted through an axial opening in the end plate 9 and extends outwardly from the end plate a sufficient length to pass through an antifriction bearing 17 secured in a sleeve 19 mounted on the vertical supporting frame 21. Preferably, though not necessarily, the sleeve 19 holds the bearing 17 against the inner shoulder 21 and the bearing is maintained thereagainst by a nut 23 threaded on the hollow axle 13. A dust cap 25 is preferably fitted against the outer side of the bearing and the tubular shaft 13 to protect the bearing and end structure from foreign substances. The opposite axle 15 attached to end plate 11 is substantially similar in construction and mounting as axle 13, before described, and it is not thought necessary to detail the components thereof. The major difference being the drive pulley 27 attached to the shaft 15 which receives rotative movement through V-belt 29 passing over conventional adjustable split belt pulley 31 mounted on the shafting 1. Control of the speed of pulley 27 is secured by an adjusting means 33 for varying the peripheral contact of the pulley belt 29 with the lower pulley 31. A belt tightener 35 may also be interposed between the driving and driven pulleys. Thus it will be observed that when the axle 15 is rotated the cage 17 will also be rotated at the same speed.

The core or initially wound shaft supply reel 5 is mounted on a transverse shaft 39 having an enlarged cylindrical head 41 passing through a cylindrical flange 43 mounted in an opening in one of the cage bars 7. The opposite end of the spool shaft 39 is screw threaded for engagement with a nut 45 having an extension 47 whereby the nut 45 may be rotated for disengagement with the screw thread on the shaft 39. A disc of friction material 49 may be interposed between the nut 45 and the cage bar 7 to prevent any slippage of the nut and a transverse reinforcing bar 51 is preferably placed across the opposite cage bar 7 parallel with the shaft 39 to insure proper rigidity of the structure.

The supply reel 5 is of conventional construction and ordinarily comprises a hollow cylinder 53 with end flanges 55 and is mounted on a reel supporting shaft 39 passing through the central opening formed in cylinder part 53 with the side flange 55 abutting the enlarged head 41 and the nut 45. A suitable friction dampening spring finger or rotation braking device 57 is employed to prevent the reel from freely unwinding and to maintain a slight drag or load on the reel. The successive layers of core material or initially wound shafting are wound as indicated at 59. This core or initially wound shafting is drawn off of the supply reel 5 through the hollow axle 15 provided with an apertured guide or funnel member 61 to insure the smooth take-off of the material from the reel. One of the intermediate bars 7 may be fixed and the separable construction used in supporting the reel between the fixed opposite cage bar 7 is such that a fresh supply reel may be quickly positioned in the unit.

The core or initially wound shafting on the supply reel is synchronized with the intermediate winding unit D as hereinafter described, and as the core or initially wound shafting 59 is drawn off it is given a twist or rotation due to the fact that the cage 7 is constantly revolved by the drive belt 29. As the core or initially wound shafting is positively drawn from the reel 5 by the unit D as hereinafter described, it passes through a winding tool C where the plurality of individual wires mounted on the standard B are brought into contact therewith and laid thereon in the desired right or left hand lead. The wire supply unit B may take the form of a plurality of platforms 61 on which are mounted a number of swivel spools 63 carrying wires 65 to be wrapped on the core or initially wound cable 59. Any desired number of wires may be unwound from the wire supply, as this is dependent on the size of the core, gage of wire and the like. These wires 65 contact the core or initially wound cable 59 adjacent an apertured vertical plate 67, the core passing through a central opening therein and the layer wires 65 passing through circumferentially spaced openings therearound. As the rotating core or initially wound cable 59 continues to be drawn through the winding tool C the arrangement of the draw plate 67 previously described, runs up the wires in even spirals on the core or initially wound cable. The construction of the winding tool C may be of any form that will accomplish the purpose, although the preferred type of winding tool is disclosed in detail and claimed in copending application of George Eisenbeis, Serial No. 468,259, now Patent 2,328,792 dated September 7, 1943. As shown the winding tool is mounted on a standard 69 adjacent the winding head on unit D whereby the wound and unwind portions of the shafting are in axial alignment through the units described.

After the core or initially wound shafting 59 is layered or wound with the wires 65, it is of greater diameter, as indicated at 75. The wound shaft 75 is positively drawn or advanced through the unit D having hollow axially aligned spaced shafts 77 and 79. These shafts are mounted in antifriction bearings secured in bearing boxes supported on vertical frames on standards 81 and 83 respectively. The inner ends of the hollow shafts 85 and 87 which are joined by a pair of spaced horizontal angle bars 89 to form a cage somewhat similar to the cage described at station A. The shafting 75 with its layer of wires 65 thereon is positively and continuously drawn through the winding head D and simultaneously rotated to layer up the wires 65 thereon as they are drawn through the winding tool C. This unit can be adjusted in such a manner that the lead of the spiral of the wire layer, the tightness thereof and its direction of rotation can be accomplished to meet the requirements desired in the finished shafting.

The winding and advancing unit D is specifically shown in Figs. 3 to 6, inclusive. Here the pair of spaced horizontal cage bars 89 are affixed at their ends to the circular end plates 85 and 87. The alternately spaced bars 97 and 99 while secured to their respective end plates 85 and 87 do not extend from end plate to end plate but are cut off and have their inwardly projecting ends joined by spaced right angle reinforcing bars 101 and 102, for supporting the shafting advancing and rotating mechanism as will be hereinafter described. The left hand drive pulley 105 secured to the tubular axle 77 is rotated through the medium of a belt 107 passing over a lower split pulley 109 attached to the main power shaft 1. The drive shaft 1 and drive pulleys for the unit are mounted on the lower supporting brackets in a similar manner to that described for unit A.

The left hand hollow shaft 77 is mounted on the machine standard in antifriction bearing 117 secured in a bearing block and with the inner end of the hollow shaft passing through an antifriction bearing 113 secured in an annular passage formed in the enlarged diameter portion of rotatable tubular member 115. This tubular member is fixed with relation to end plate 85 so that the bearings 111 and 113 permit the hollow shaft 77 to rotate freely. The inner race of intermediate antifriction bearing 117 formed on the outwardly extending stepped shoulder 119 of the end plate 85 is mounted in a recess formed in the bearing block whereby relative movement may occur between the hollow shaft 77 and the rotating cage defined by the bars 89, 97 and 99. The enlarged inner end 121 of the hollow axle 77 is toothed for engaging a gear 123 mounted on a fixed axle 125 passing through the end plate 85 and in parallel relation to the hollow shaft 77. Also carried on this axle 125 is a smaller pinion 127 which engages a second larger pinion 129 mounted on shaft 131 journalled in an end plate 85. The opposite end of shaft 131 is secured in an end bracket or bearing block 133 affixed to the outside of one of the bars 103 joining a pair of the shorter cage bars 99. The opposite spaced press bar 103 joining the opposite pair of short cage bars 99 forms the support for two right angled axles 135 and 137 on which are mounted presser wheels 139 and 141 respectively.

The shaft 131 also carried an intermediate worm gear 151 which engages a worm pinion 153 carried on transverse shaft 155 whose ends are secured in opposite spaced cage bars 89. The transverse shaft 155 also carries a flexible shafting drawing drum 157 secured thereto. This drum may be provided with upstanding parallel edges and fitted with a friction material around its periphery, although this is not essential. A freely rotatable pulley 159 is carried on shaft 161 mounted between the other pair of spaced brace bars 101 that join the short cage bars 97. An additional brace bar or bolt 163 lying in parallel spaced relation to transverse shaft 155 joins the longitudinal cage bars 89 to give rigidity to the cage and the mechanism contained therein.

A pivoted resilient shafting guide finger or lever 165 is pivotally mounted on a rod 167 held between the spaced brace bars 101 with the end of the finger engaging the surface of the draw pulley 157 by means of coil spring 169. The opposite end of this spring is attached to an adjustable telescoping bar 171 pivotally secured at one end to a fork member 173. The lower end of the fork is mounted on shaft 137 which also carries idler wheel 141. The upper idler 139 mounted on shaft 135 is carried between the side arms of the fork, and due to the intermediate telescoping connection 175 formed in the adjustable bar 171 permits the idler 139 to normally press against the periphery of pulley 157 or the shafting therearound. The normally fixed portion of the bar 171 is mounted in a block 177 carried between the brace arms 101. Adjustment of the fixed portion of the telescoping member is secured by taking up on the nut screw threaded to the end of the member.

The right hand hollow shaft 79 carries a drive pulley 181 driven by belt 183 engaging lower pulley 185 mounted on the power shaft 1. As before described, the hollow shaft 79 extends inwardly and is attached to the right hand end plate 87. This shaft is mounted in an antifriction bearing 187 whereby when the pulley 181 is rotated the entire cage of the winding and shafting advancing unit is rotated. Through the mechanism previously described, the draw pulley 157 is also rotated when the hollow shaft 77 and its pulley 105 is rotated.

In operation the flexible shaft 75 is threaded through the winding unit and passed over the grooved idler 159 into engagement with pulley 157 and thence over lower grooved idler 151 and upwardly from the unit through right hand hollow shaft 79. The upper adjustable idler or presser wheel 139 carried in the fork 173 presses against the convolutions of the shafting carried by the drum. As the cage and pulley 157 are driven the shafting will be continuously drawn or advanced through the units and simultaneously the shafting is rotated to supply the wire 65 to the core or initially wound shafting as it is drawn through the winding unit C. The pivoted finger 65 maintains the convolutions of the flexible shafting flat on the pulley 157 so that the convolutions cannot build up on one another.

Following the winding and drawing operation performed in unit D the shafting is drawn to the unit E where it is wound up on take-off roller 191. The take-up unit, as far as the reel mounting and reel holding cage is concerned, is similar in construction to the supply unit A and need not be again described in detail. The differences in the takeup unit over the supply unit are primarily in the drive means for the takeup reel and the traversing mechanism for insuring the smooth winding of the convolutions and layers of the shaft on the takeup reel. The reel 191 is removably mounted on a detchable shaft 193 secured between opposite cage arms 195. In addition to the detachable feature of the shaft 193 as previously described with relation to unit A, the shaft carries a drive disc 197 mounted thereon beyond the end of the takeup reel but in contact therewith when the reel is placed and secured in the apparatus. This disc is rotated by means of a friction plate 199 carried on horizontal shaft 201 passing through a tube 203 having one end secured in anti-friction bearing 205. The end extension of shaft 203 passes through an anti-friction bearing 207 and spring device 208 placed in the hub 209 whereby the bearing 207 is pressed against the shoulder 206 and keeps the plate 199 in contact with disc 197. The end of the shaft 201 is supported adjacent the drive pulley 211 secured thereto by an apertured end nut 213.

In operation, when it is desired to collect and layer up shafting on the collection reel 191, shaft 201 is driven by pulley 211 and belt 213 engaging the lower split pulley 215 attached to the main power shaft 1. The rotating plate 199 engages the periphery of the friction disc 197 and consequently rotates the takeup reel 191 in the proper direction and draws the incoming shafting 75 through the apertured guide 211 fitted within the end of the left hand hollow shaft 219. Rotation of the collection reel cage is secured by driving shaft 219 through pulley 221 having a drive belt 223 passing over lower drive pulley 225 secured to the main shaft 1. The inner end of the hollow axle 219 is rigidly fixed to the end plate 227 carrying one end of the spaced longitudinal cage bars 195. A traverse mechanism is provided for layering up the flexible shafting on the takeup reel and comprises a double traversing helix 229 having reduced diameter ends 231 mounted in bushings 233 carried in openings formed in opposite cage bars 195. The double traversing helical screw threaded cylinder 29 is rotated by means of a pulley 235 receiving movement by belt 237 secured to the takeup reel shaft 193. The drive plate 199 and friction member 197 rotating the takeup reel also drives pulley 239 for transmitting this movement.

Also mounted between the cage bars 195 and in spaced parallel relation to the double screw threaded cylinder 229 is a rod 241 on which is slidably mounted a bracket 243 having an oblique bore formed in the enlarged portion 245 therein for the purpose of carrying a guide rod 247 to which is secured a plate 249 having a semicircular depression 251 in the outer edge thereof for engagement with the double traversing helical screw thread on cylinder 229. The plate 249 is urged outwardly by spring 253 to insure its constant contact with the threads on the traversing cylinder. The traversing bracket 241 carries a vertical guide rod 255 against which the incoming shaft 75 contacts and receives lateral movement for layering up the convolutions of the shafting on the takeup reel in a uniform manner. Reverse or transverse movement of the guide rod 225 when the bracket reaches one end of its travel is accomplished by the constant engagement of the plate 229 with the double helical threads on the traversing cylinder. It is obvious that when the end of the traversing cylinder is reached the double thread will reverse the movement of the bracket carrying the guide rod and carry it in the opposite direction until it reaches the other end of the double thread. Occasionally the sliding bracket becomes hung up at the end of the thread, and to insure the return of the bracket and guide coil springs 257 are mounted on the rod 255 abutting the side cage bars. Thus when the bracket 245 reaches the end of its travel and compresses one of the springs its resiliency will be sufficient to start the plate 255 into engagement with the return helical traversing thread.

After the length of core or initially wound shafting on the supply reel in unit A has been drawn through the machine and spirally sheathed as described, the collection reel in unit E is exchanged with the previous supply reel if a further layer of wire thereon is desired. This interchange is continued until sufficient layers have been laid up to form the finished flexible shafting. As before stated, the spiral layers are wound in opposite direction and this is readily accomplished by reversing the drive belts of the units or reversing the direction of rotation of the main power shaft 1.

I claim:

1. A flexible shafting collection device comprising a pair of outwardly extending hollow axles mounted in anti-friction bearings and circular end plates secured to oppositely positioned longitudinal side bars joining said end plates, a transverse axle detachably secured to said side bars, a collection reel mounted on said transverse axle, a drive disc secured to said transverse axle and abutting said collection reel, a drive plate in contact with the periphery of said drive disc and secured to an axle extending outwardly through one of said hollow axles, independent drive means for the other of said hollow axles and the drive axle extending through the first mentioned hollow axle; the shafting to be collected on said reel passing through the independently driven second mentioned hollow shaft.

2. A collection device as defined in claim 1 wherein a traversing guide for directing the incoming shafting on to said collection reel in uniform layer is mounted between said side bars, and consists of rod and a driven double helically threaded cylinder lying in spaced parallel relation to said transverse reel axle, a bracket adapted to slide on said rod, said bracket having a guide thereon for contacting and guiding the incoming shafting and a spring pressed finger engaging the double helically threaded cylinder.

CLARENCE F. HOTCHKISS, JR.